(12) United States Patent
Krantz et al.

(10) Patent No.: US 9,246,693 B2
(45) Date of Patent: *Jan. 26, 2016

(54) AUTOMATIC UTILIZATION OF RESOURCES IN A REALTIME CONFERENCE

(71) Applicant: Microsoft Technology Licensing, LLC, Redmond, WA (US)

(72) Inventors: Anton W. Krantz, Kirkland, WA (US); Brian S. Meek, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/446,810

(22) Filed: Jul. 30, 2014

(65) Prior Publication Data

US 2014/0344366 A1 Nov. 20, 2014

Related U.S. Application Data

(63) Continuation of application No. 12/409,540, filed on Mar. 24, 2009, now Pat. No. 8,798,252.

(51) Int. Cl.
| | |
|---|---|
| *H04M 3/42* | (2006.01) |
| *H04L 12/16* | (2006.01) |
| *H04Q 11/00* | (2006.01) |
| *G06F 15/16* | (2006.01) |
| *G06F 15/167* | (2006.01) |
| *H04L 12/18* | (2006.01) |

(52) U.S. Cl.
CPC .................................. *H04L 12/1818* (2013.01)

(58) Field of Classification Search
CPC .......... H04M 3/56; H04M 2203/5054; H04M 2203/5509; H04M 2203/5018
USPC ........ 379/221, 202.01, 260, 201.01; 709/204, 709/213, 212; 370/260
See application file for complete search history.

(56) References Cited

U.S. PATENT DOCUMENTS 7,412,047 B2 * 8/2008 Nguyen et al. ........... 379/202.01
7,426,192 B2 * 9/2008 Amano et al. ................ 370/261

* cited by examiner

*Primary Examiner* — Thjuan K Addy
(74) *Attorney, Agent, or Firm* — Andrew Smith; Sonia Cooper; Micky Minhas

(57) ABSTRACT

The architecture facilitates the association of resources (e.g., hardware software) with a meeting location such as a conference room or conference space. Additionally, the room and resources can be associated with a realtime conference or meeting at the meeting location. Still further, the resources can be automatically joined to the meeting being held in the room, for both the organizer of the meeting and the remote participants of the meeting. The resources are network addressable and register to a communications infrastructure for online availability. The architecture automatically joins the conference room resources to any conference or call that is being held in the locale (e.g., room) of the conference, and which the user has joined using a realtime conferencing application. The resources distributed across multiple meeting locations can be utilized for a single session, as well.

20 Claims, 11 Drawing Sheets

AUTOMATIC UTILIZATION OF RESOURCES IN A REALTIME CONFERENCE

CROSS-REFERENCE TO RELATED APPLICATIONS

This application is a Continuation of U.S. patent application Ser. No. 12/409,540, filed on Mar. 24, 2009, now U.S. Pat. No. 8,798,252, issue date Aug. 5, 2014, and entitled "AUTOMATIC UTILIZATION OF RESOURCES IN A REALTIME CONFERENCE."

BACKGROUND

Existing communications architectures enable users to easily join realtime conferences from personal computers and join the realtime modes supported, such as audio, video, and application sharing. This works well for a single user joining a conference from an office or workspace. However, when entering a conference room that has resources not readily usable for that meeting, someone has to configure the resources. For example, the user may have to dial into the conference from the conference room phone, configure the resources separately or request that the resources be configured ahead of the meeting. The resources can be technically insufficient in that some of the resources oftentimes employed in the conference are manually configured for the meeting. For example, resources such as the conference room phone, conference room audio/video system, whiteboard camera, or electronic whiteboard can require upfront time and effort to prepare these resources for efficient utilization during the meeting or conference.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the association of resources (e.g., hardware software) with a meeting location such as a conference room or conference space. Additionally, the room and resources can be associated with a realtime conference or meeting at the meeting location. Still further, the resources can be automatically joined to the meeting being held in the room, for both the organizer of the meeting and the remote participants of the meeting.

The resources are network addressable (e.g., IP-based wired and wireless) and register to a communications infrastructure for online availability. The resources can include audio devices such as standard (non-IP) and IP-based telephones, microphones, electronic and/or network-attached whiteboards, audio/video systems that provide video capture of participants and meeting location aids, computers, and so on.

The architecture automatically joins the conference room resources to any conference or call that is being held in the locale (e.g., room) of the conference, and which the user has joined using a realtime conferencing application. The phone or audio/video systems capture the audio and/or video from the room for the benefit of the remote participants, and the whiteboard content is shared via application sharing. This occurs automatically without requiring user configuration.

The resources registered to the infrastructure can be distributed across multiple meeting locations such that each meeting location can be configured as a separate realtime conference or meeting. Additionally, a conference or meeting can be configured to occur over several meeting locations using the resources for each of the meeting locations for a single session.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates an exemplary user interface for associating resources with a meeting location.

FIG. 5 illustrates an exemplary meeting request UI for associating the meeting location room and resources with a realtime conference or meeting.

DETAILED DESCRIPTION

Figure 1:
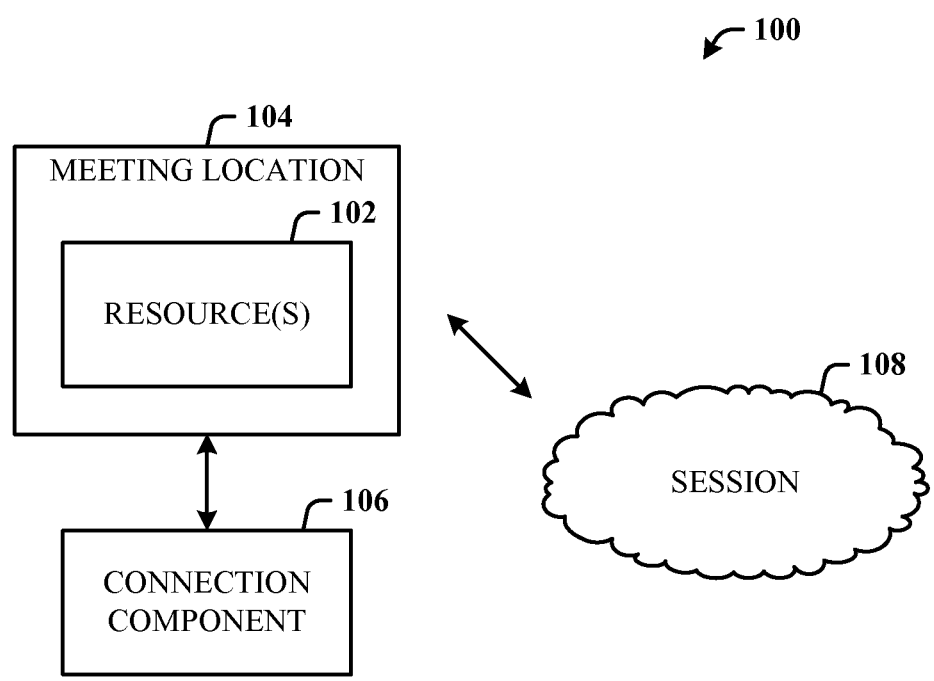
FIG. 1 illustrates a computer-implemented communications system in accordance with the disclosed architecture.

The disclosed architecture enables automatic configuration and utilization of realtime communications components in a realtime meeting or conference. Network addressable resources are automatically registered and associated with physical meeting locations, and then automatically joined to the meeting. The architecture is not restricted to conferences, but can also be employed in mesh networks, for example, without conferencing servers. Other details are described herein below.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented communications system 100 in accordance with the disclosed architecture. The system 100 includes network addressable resources 102 associated with a meeting location 104, and a connection component 106 for automatically connecting the resources 102 to a session 108 (e.g., conference, meeting) associated with the meeting location 104 for realtime utilization of the connected resources 102 by local and remote session participants.

The resources 102 can include an audio device a standard non-IP phone, an IP-based phone (e.g., VoIP (voice-over-IP)), an electronic and/or network-attached whiteboard, an audio/video device for capturing video and audio, and/or a computer, for example. The resources 102 can be automatically joined relative to start of the session, based on actions of the presenter, scheduled time, or other session participants, for example.

Additional details about the system 100 include the meeting location being assigned an identity that is addressable by realtime communication applications. All of the resources 102 are associated with the identity of the meeting location 104. Alternatively, each of the resources 102 is assigned a different identity that is then associated with the meeting location 104.

Figure 2:
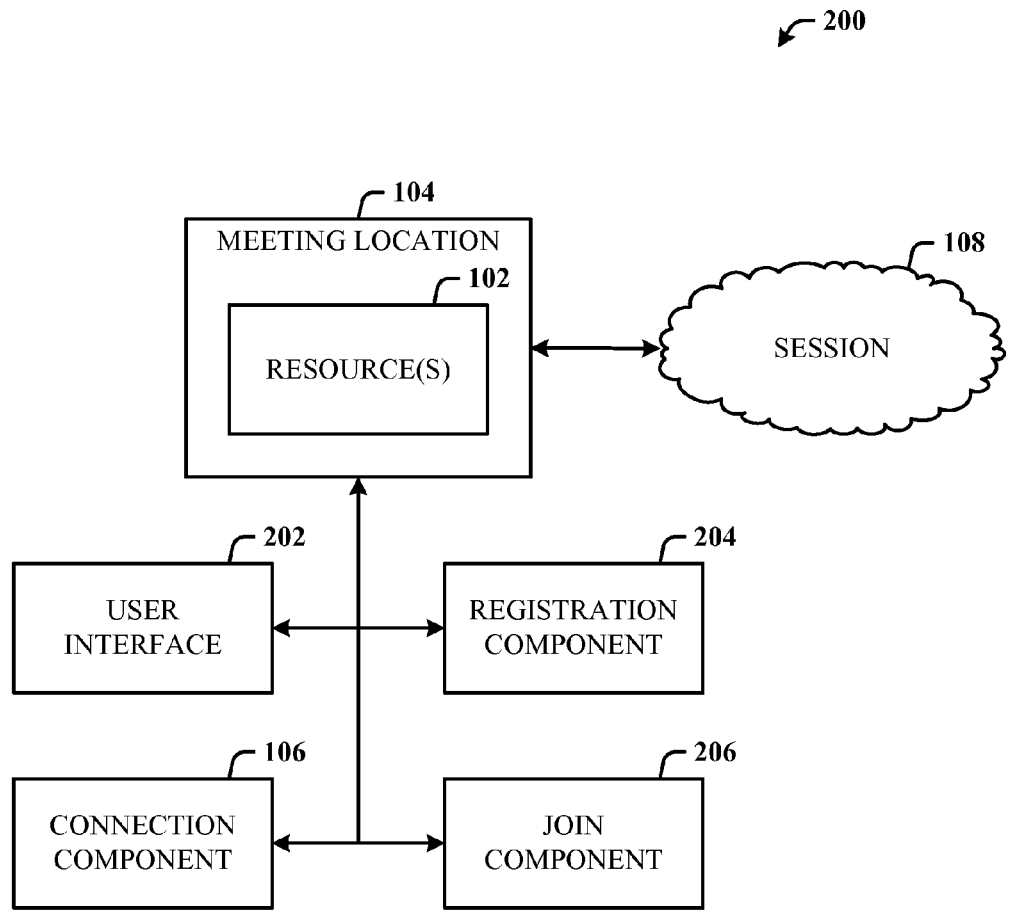
FIG. 2 illustrates an alternative embodiment of a system that further employs registration and join of the resources for realtime communications during the session.

FIG. 2 illustrates an alternative embodiment of a system 200 that further employs registration and join of the resources 102 for realtime communications during the session 108. The system 200 includes a user interface 202 for adding the resources 102 to properties of the meeting location 104. The system 200 can further comprise a registration component 204 for registering the resources 102 to a communications infrastructure to make the resources 102 network addressable and available for use. The system 200 can further include a join component 206 for joining the resources 102 into the session 108.

Figure 3:
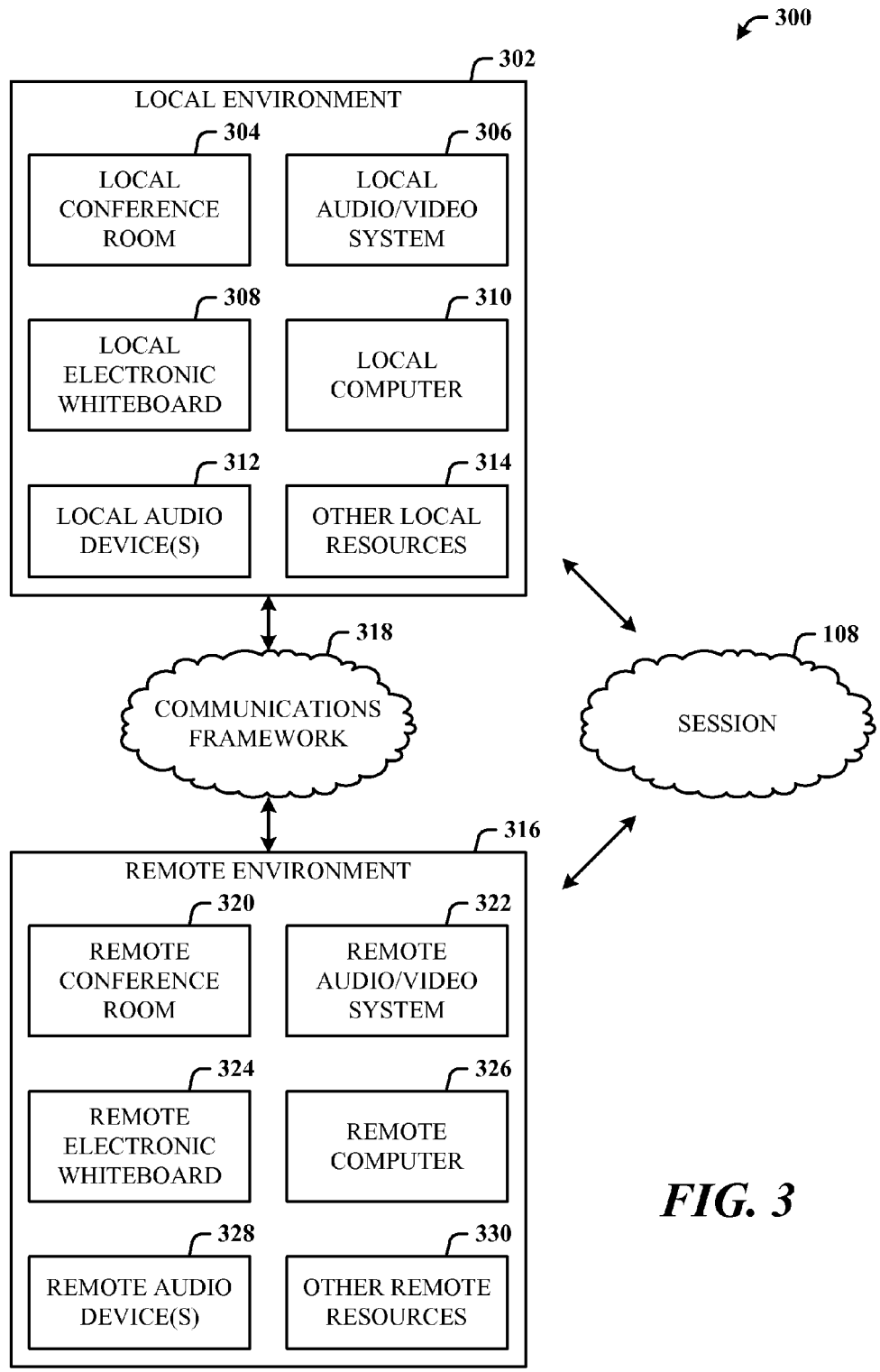
FIG. 3 illustrates a system of session environments for interacting in a session.

FIG. 3 illustrates a system 300 of session environments for interacting in a session. A local environment 302 includes a local conference room 304, a local audio/video system 306, a local electronic whiteboard 308, a local computer 310, local audio device(s) 312 (e.g., phones), and other local resources 314 (e.g., peripheral devices, individual computer cameras, microphones, etc.). The local environment 302 can communicate with participants in a remote environment 316 via a communications framework 318 that facilitates participation in the session 108. The communications framework 318 includes the PSTN (public-switched telephone network), IP phones (e.g., VoIP), cell phone carriers, IP networks, short-range wireless systems (e.g., wi-fi) and so on. Similarly, the remote environment 316 includes a remote conference room 320, a remote audio/video system 322, a remote electronic whiteboard 324, a remote computer 326, remote audio device(s) 328 (e.g., phones), and other remote resources 330 (e.g., peripheral devices, individual computer cameras, microphones, etc.).

The local resources (306, 308, 310, 312 and 314), once registered, become available for use in the local environment as assigned to the local conference room 304. This use occurs automatically with the activities of the session 108. For example, the local resources can be activated (e.g., joined) a predetermined amount of time before the session 108 is to begin or at the scheduled session start time, and released a predetermined amount of time after the session 108 terminates or at the scheduled session end time. Other triggers can be the joining of the local presenter into the session 108, the joining of a majority of the session participants, the joining of a principal participant, the joining of a remote participant, etc.

Similarly, the remote resources (322, 324, 326, 328 and 330), once registered, become available for use in the remote environment as assigned to the remote conference room 320. This use can also occur automatically with the activities of the session 108. For example, the remote resources can be activated (e.g., joined) a predetermined amount of time before the session 108 is to begin, and released a predetermined amount of time after the session 108 terminates. Other triggers can be the joining of the remote presenter into the session 108, the joining of a majority of the session participants (local and remote), the joining of a principal participant, the joining of a local participant, etc.

In a common enterprise, registration can be to the components of communications framework 318. In different enterprises, registration can be to respective registration components of the enterprises.

The physical conference room or space (e.g., local conference room 304 and remote conference room 320) can be configured as a resource in a scheduling application such as a messaging service, messaging/scheduling server, and/or PIM (personal information management) client application, for example. The audio device(s) (e.g., local audio device(s) 312 and remote audio device(s) 328) and audio/video systems (e.g., local audio/video system 306 and remote audio/video system 322) such as a conference IP phone capable of registering with a realtime communications infrastructure (e.g., a communications server). These devices and systems can be configured as a resource in the aforementioned scheduling application.

The electronic whiteboard device can be used to share meeting content, and is also capable of registering with the realtime communications infrastructure, and can be configured as a resource in same scheduling application. The computers (e.g., local computer 310 and remote computer 326) can be running compatible realtime conference applications; however, this is not a requirement.

Figure 4:
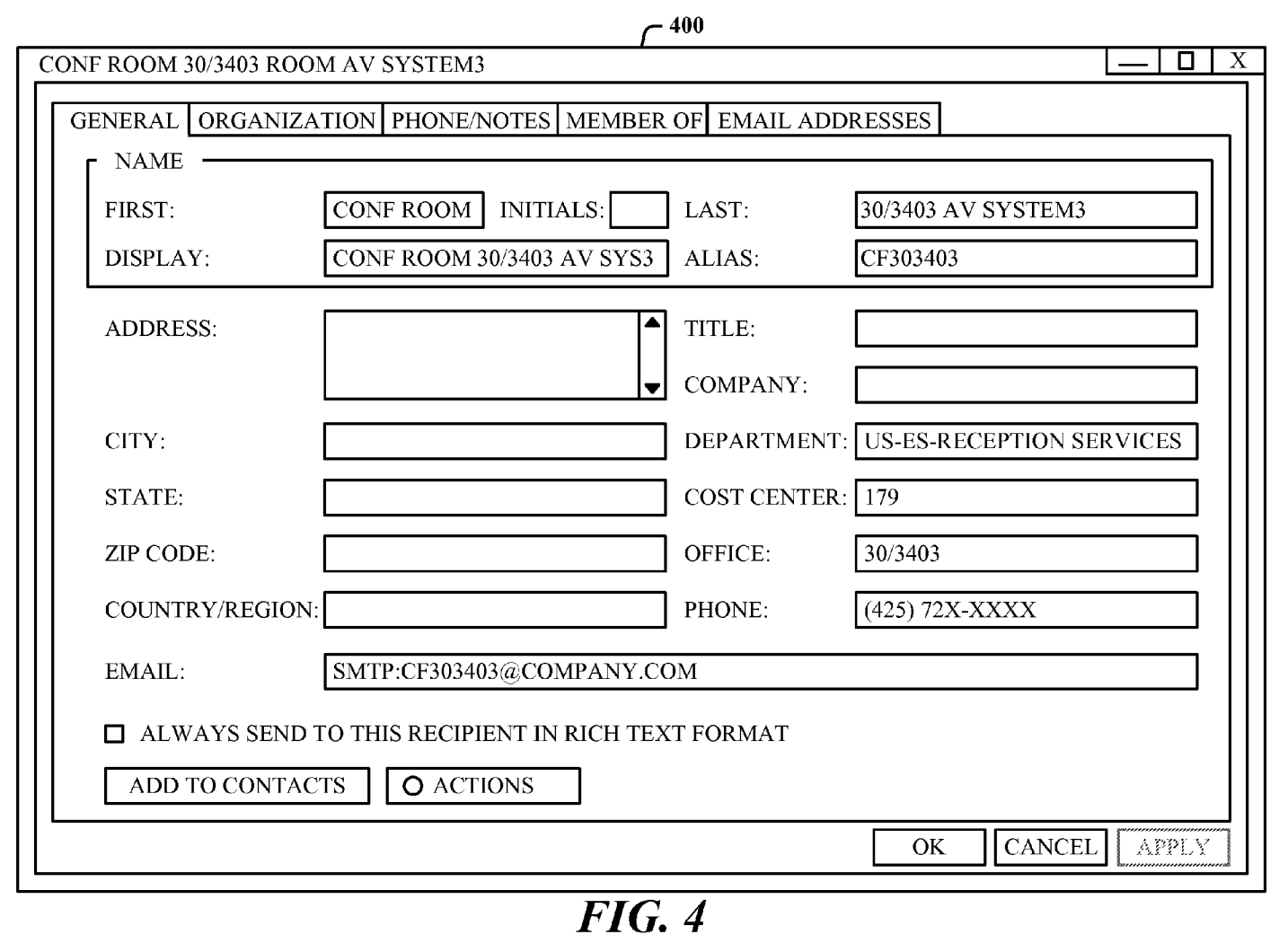

FIG. 4 illustrates an exemplary user interface (UI) 400 for associating resources with a meeting location. The UI 400 shows properties for a conference room that include information such as physical location and phone number of the phone in the conference room. In some implementation, the conference room can be added as a resource to a corporate directory and used for scheduling purposes.

The conference room can carry an identity such as a SIP (session initiation protocol) identity, for example, SIP: cf303403@company.com, such that realtime applications can address the conference room for realtime communications. The devices which are physically present in the conference room can either be associated with the same SIP identity or can be given separate arbitrary identities which are linked to the conference room, for example, SIP: avsystem33403@company.com, to denote the A/V device, and SIP:whiteboard3403@company.com to denote the whiteboard. These identities are used for associating the room and resources with the realtime conference or meeting location.

In this example UI 400, properties include the resource type (e.g., CONF ROOM), specific resource (30/3403 AV SYSTEM3), the resource information to display, and resource alias. Other property information that can be included are address, city, state, zip code, country/region, title, company, department, cost center, office, phone number for a phone in the conference room, and email address for addressing the session.

There are several methods for configuring the conference room devices. First, user objects in a network directory service can be utilized with limited access, machine objects in the network directory service (similar to domain-joined computers) and, user or machine objects in a third-party directory. An administrator can configure the devices (resources) via a network directory service management console or similar administrative tool. Once the resources are configured, the resources can be associated with the conference room.

Figure 5:
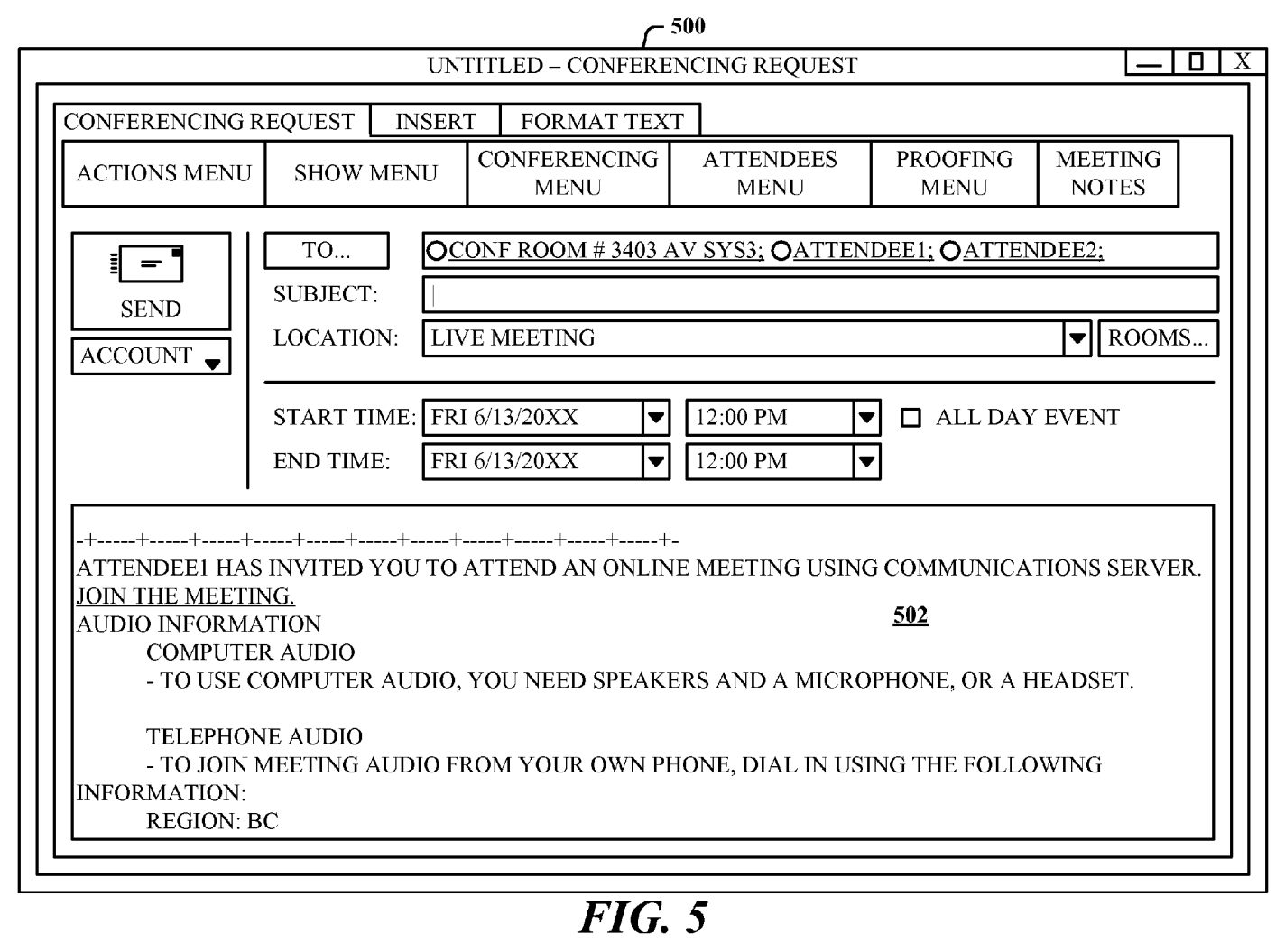

FIG. 5 illustrates an exemplary meeting request UI 500 for associating the meeting location room and resources with a realtime conference or meeting. Realtime applications can provide add-ins for scheduling applications that allow scheduling of realtime meetings. In the UI 500, a meeting is scheduled that contains remote participants and a conference room. An invitation also includes a link (e.g., JOIN THE MEETING) to the meeting, which contains an automatically generated conference identity. Selecting the link launches a realtime application and joins the meeting. The UI 500 includes the capabilities to send the information according to a specific email account, to users, based on a subject, and location, and meeting information in a body section 502 of the UI 500.

Since the conference is scheduled in a physical meeting room that includes realtime resources, the Join Meeting link also includes links to join the realtime devices to the conference. The realtime devices can be activated by the presenter or by the first attendee to join the conference.

Figure 6:
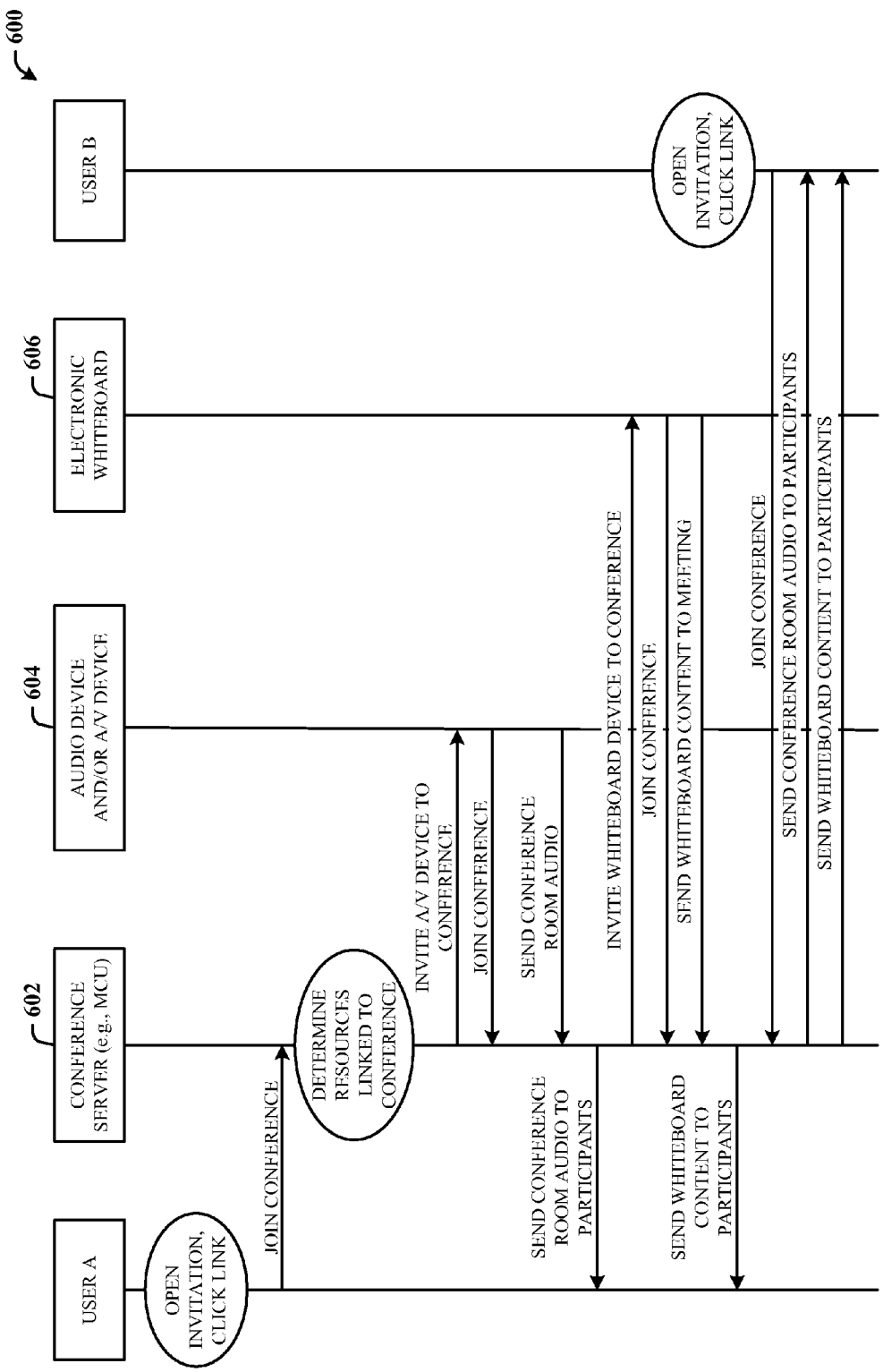
FIG. 6 illustrates a call flow diagram for a setup a sequence for a presenter in a conference room.

FIG. 6 illustrates a call flow diagram 600 for a setup a sequence for a presenter in a conference room. Resources can be automatically joined to a meeting being held in a room, for both the organizer of the meeting and the remote participants of the meeting. Once association has been made between realtime resources and a realtime conference, and a participant has joined the conference, the process for setting up the conference can be as shown in the diagram 600.

Consider that User A is the conference organizer and activates the conference. User A receives the invitation (e.g., via email) and selects (clicks) the embedded meeting link to join the conference. This action is processed to the conference server 602 (e.g., an MCU (multipoint control unit)). The conference server 602 then determines the resources to be linked to the conference. Since the conference has been scheduled in a room with realtime resources, the conference server 602 (a server role for managing conferences) invites the realtime resources to the conference using an APP INVITE message. The APP INVITE message is automatically accepted and the realtime devices can be used to provide content to the conference. For example, an invite is made from the conference server 602 to the audio and/or A/V device 604.

The audio device and/or the A/V device 604 join the conference by responding to the conference server 602. The conference server 602 then activates audio to the participants, such as User A. Similarly, the conference server 602 sends an invite to an electronic whiteboard 606. The whiteboard 606 responds by joining the conference, and then commences sending whiteboard content to the meeting. The conference server 602 forwards the whiteboard content to the participants (e.g., User A). Thereafter, User B joins the conference by opening an invitation and selecting (clicking) the meeting link. The conference room audio is then sent to User B, as well as the whiteboard content to all participants, that include User B. User B joins the conference after the conference has been set up, and is able to receive content provided by the conference room realtime devices.

Figure 7:
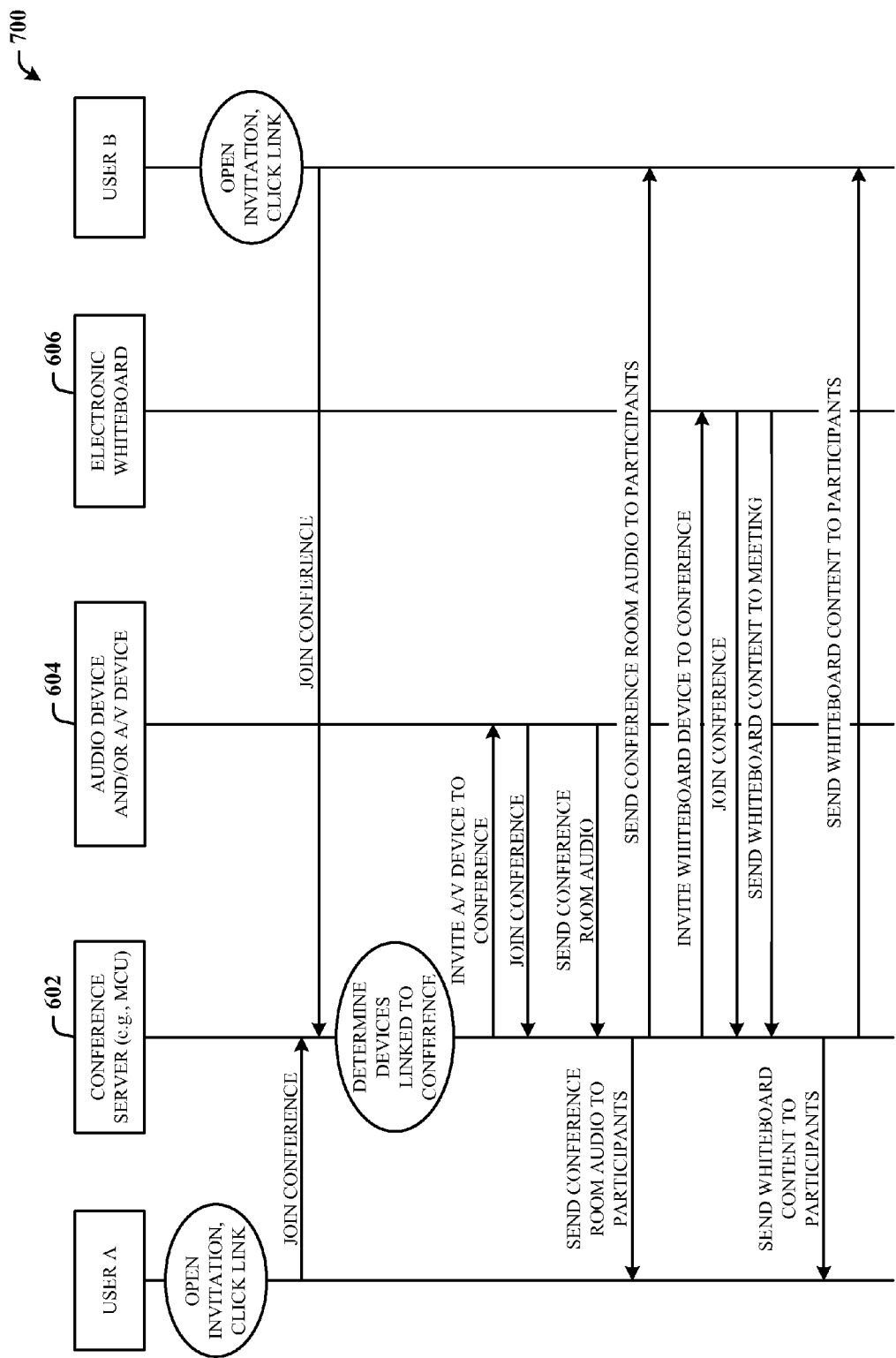
FIG. 7 illustrates a call flow diagram for joining a remote participant in a conference room.

Note that User B may also participate from a room that includes realtime devices. FIG. 7 illustrates a call flow diagram 700 for joining a remote participant in a conference room. As shown in the diagram 700, User B can join the conference and automatically share the conference room realtime devices with the presenter and other remote meeting participants. Here, User B joins the conference just after User A joins. Thereafter, the conference server 602 then determines the resources to be linked to the conference. Since the conference has been scheduled in a room with realtime resources, the conference server 602 (a server role for managing conferences) invites the realtime resources to the conference using an APP INVITE message. The APP INVITE message is automatically accepted and the realtime devices can be used to provide content to the conference.

For example, an invite is made from the conference server 602 to the audio device and/or A/V device 604. The audio device and the A/V device 604 join the conference by responding to the conference server 602. The conference server 602 then activates audio to the participants, such as User A and User B.

Similarly, the conference server 602 sends an invite to the electronic whiteboard 606. The whiteboard 606 responds by joining the conference, and then commences sending whiteboard content to the meeting. The conference server 602 forwards the whiteboard content to the participants (e.g., User A and User B).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
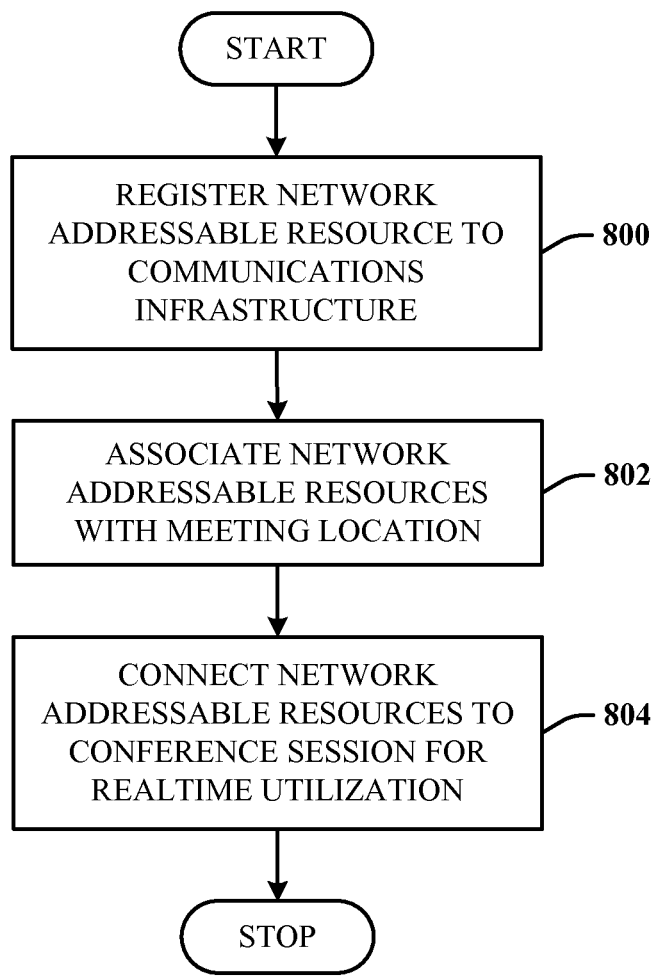
FIG. 8 illustrates a communications method for automatically employing resources in a realtime conference.

FIG. 8 illustrates a communications method for automatically employing resources in a realtime conference. At 800, registering network addressable resources are registered to a communications infrastructure. At 802, the network addressable resources are associated with a meeting location. At 804, the network addressable resources are connected to a conference session for realtime utilization.

Figure 9:
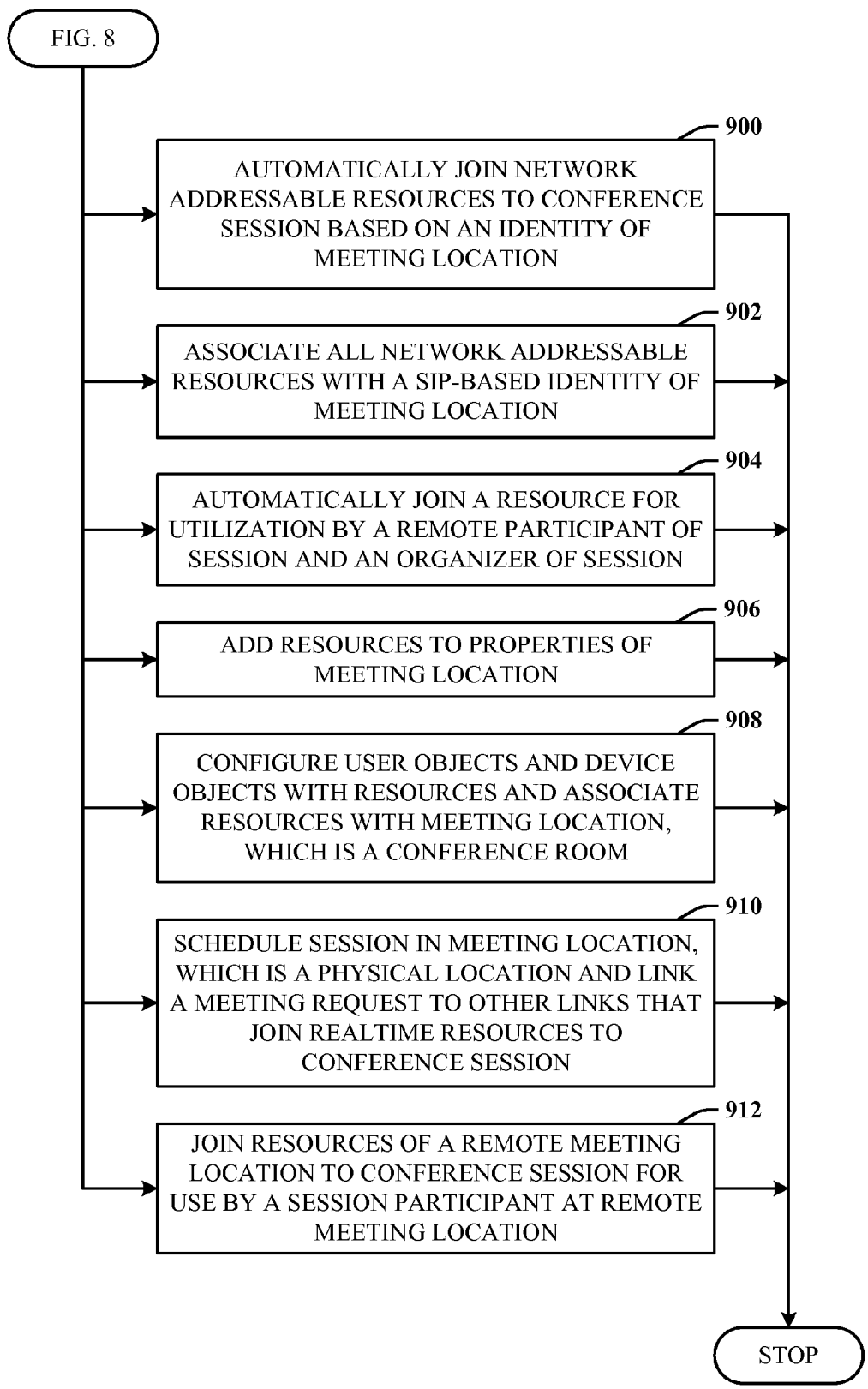
FIG. 9 illustrates additional aspects of the method of FIG. 8.

FIG. 9 illustrates additional aspects of the method of FIG. 8. At 900, the network addressable resources are automatically joined to the conference session based on an identity of the meeting location. At 902, all the network addressable resources are associated with a SIP-based identity of the meeting location. At 904, a resource is automatically joined for utilization by a remote participant of the session and an organizer of the session. At 906, the resources are added to properties of the meeting location. At 908, user objects and device objects are configured with the resources and the resources are associated with the meeting location, which is a conference room. At 910, the session is scheduled in the meeting location, which is a physical location, and a meeting request is linked to other links that join the realtime resources to the conference session. At 912, resources of a remote meeting location are joined to the conference session for use by a session participant at the remote meeting location.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
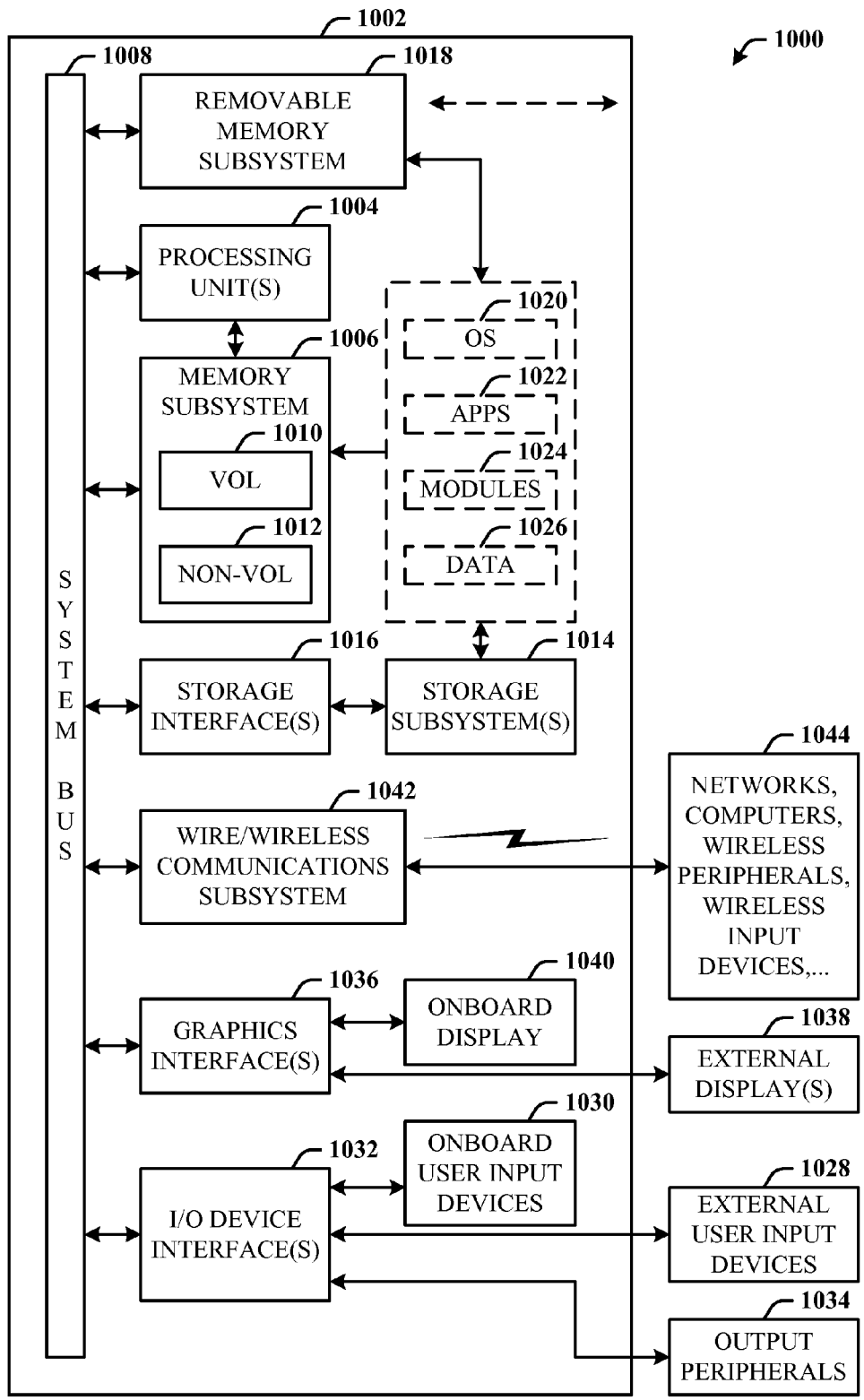
FIG. 10 illustrates a block diagram of a computing system operable to execute automatic resource utilization in realtime communications in accordance with the disclosed architecture.

Referring now to FIG. 10, there is illustrated a block diagram of a computing system 1000 operable to execute automatic resource utilization in realtime communications in accordance with the disclosed architecture. In order to provide additional context for various aspects thereof, FIG. 10 and the following discussion are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the memory subsystem 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes storage subsystem(s) 1014 and storage interface(s) 1016 for interfacing the storage subsystem(s) 1014 to the system bus 1008 and other desired computer components. The storage subsystem(s) 1014 can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a removable memory subsystem 1018 (e.g., flash drive form factor technology), and/or the storage subsystem(s) 1014, including an operating system 1020, one or more application programs 1022, other program modules 1024, and program data 1026. Generally, programs include routines, methods, data structures, other software components, etc., that perform particular tasks or implement particular abstract data types.

Where the computer 1002 is employed for client access as a client machine or as a server machine, the one or more application programs 1022, other program modules 1024, and program data 1026 can include the components and entities of system 100 of FIG. 1, the components and entities of system 200 of FIG. 2, support the components and entities of system 300 of FIG. 3, the UI 400 of FIG. 4, the UI 500 of FIG. 5, the call flow diagrams (600 and 700) and the methods represented by the flowcharts of FIGS. 8-9, for example.

All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Computer readable media can be any available media that can be accessed by the computer 1002 and includes volatile and non-volatile media, removable and non-removable media. For the computer 1002, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP) using logical connections via a wired/wireless communications subsystem 1042 to one or more networks and/or other computers. The other computers can include workstations, servers, routers, personal computers, microprocessor-based entertainment appliance, a peer device or other common network node, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or has other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 11:
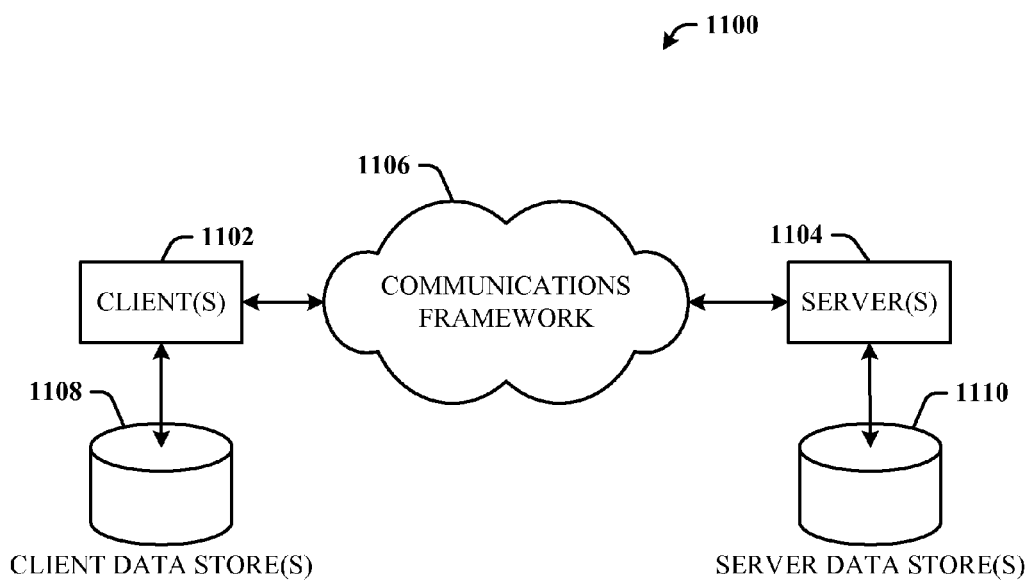
FIG. 11 illustrates a schematic block diagram of a computing environment for automatic resource utilization in realtime communications in accordance with the disclosed architecture.

Referring now to FIG. 11, there is illustrated a schematic block diagram of a computing environment 1100 for automatic resource utilization in realtime communications in accordance with the disclosed architecture. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications method, comprising:
   identifying one or more network addressable communications resources in a physical location;
   said physical location having a network addressable identity;
   associating one or more of the network addressable communications resources with the network addressable identity;
   associating the network addressable identity with a communications infrastructure; and
   using a network directory service of the communications infrastructure to initiate a realtime conference session associated with the network addressable identity and to configure and connect one or more of the associated network addressable communications resources to the realtime conference session.

2. The computer-implemented communications method of claim 1 wherein one or more of the communications resources are used to provide content to participants of the realtime conference session.

3. The computer-implemented communications method of claim 1 the communications resources include any combination of audio devices, whiteboard devices, and video devices.

4. The computer-implemented communications method of claim 1 wherein the communications infrastructure generates one or more invitations to join the realtime conference session, each invitation including a link to the network addressable identity associated with the realtime conference session.

5. The computer-implemented communications method of claim 4 wherein the invitations are automatically transmitted to one or more of the network addressable communications resources prior to the start of the realtime conference session.

6. The computer-implemented communications method of claim 5 wherein:
one or more of the network addressable communications resources automatically accept the invitation; and
any of the communications resources that accept the invitation are automatically reserved prior to the realtime conference session start time.

7. The computer-implemented communications method of claim 4 wherein the invitations are automatically transmitted to one or more users prior to the start of the realtime conference session.

8. The computer-implemented communications method of claim 1 further comprising a registration component associating one or more of the communications resources with the communications infrastructure to make those communications resources network addressable.

9. The computer-implemented communications method of claim 1 wherein users that join the realtime conference session are automatically provided with access to interact with one or more of the network addressable communications resources.

10. A communications system, comprising:
registering one or more hardware-based communications resources to a communications infrastructure to make the communications resources network addressable;
associating one or more of the network addressable communications resources with a physical meeting location having a network addressable identity that is registered to the communications infrastructure;
using the communications infrastructure to generate one or more invitations to join a realtime conference session associated with the network addressable identity, each invitation including a link to the network addressable identity associated with the realtime conference session; and
using a network directory service of the communications infrastructure to initiate the realtime conference session and to configure and connect one or more of the network addressable communications resources to the realtime conference session.

11. The system of claim 10 wherein the network addressable identity of the physical meeting location and the network addressable communications resources associated with the physical meeting location are addressable by one or more realtime communication applications.

12. The system of claim 10 further comprising a user interface for adding one or more of the communications resources to property information associated with the realtime conference and for configuring one or more of the communications resources for use with the realtime conference.

13. The system of claim 10 wherein:
invitations received by one or more of the network addressable communications resources are automatically accepted prior to the start of the realtime conference session; and
any of the communications resources that accept one of the invitations are automatically reserved for use by the realtime conference session.

14. The system of claim 10 wherein users that join the realtime conference session are automatically provided with access to interact with one or more of the network addressable communications resources.

15. A method for initiating a realtime conference session, comprising:
registering a network addressable identity of a physical meeting location to a communications infrastructure;
associating one or more network addressable hardware communications resources with the physical meeting location;
using the communications infrastructure to generate invitations for a realtime conference session associated with the network addressable identity of the physical meeting location and the associated network addressable hardware communications resources; and
using a network directory service of the communications infrastructure to initiate the realtime conference session and to configure and connect one or more of the associated network addressable hardware communications resources to the realtime conference session.

16. The method of claim 15 further comprising transmitting the invitations to one or more user participants prior to a scheduled start time of the realtime conference session, each invitation providing a link to join the realtime conference session via a networked environment.

17. The method of claim 15 further comprising joining one or more hardware communications resources of a remote meeting location to the realtime conference session for use by one or more user participants at the remote meeting location.

18. The method of claim 15 wherein the network addressable identity of the physical meeting location and the network addressable communications resources associated with the physical meeting location are addressable by a plurality of realtime communication applications.

19. The method of claim 15 one or more of the communications resources include any combination of interactive audio devices, interactive whiteboard devices, and interactive video devices, which are accessible to user participants of the realtime conference session.

20. The method of claim 15 further comprising a user interface for managing property information associated with the realtime conference session.

* * * * *